(12) United States Patent
Benson et al.

(10) Patent No.: US 6,510,516 B1
(45) Date of Patent: Jan. 21, 2003

(54) SYSTEM AND METHOD FOR AUTHENTICATING PEER COMPONENTS

(75) Inventors: Greg Benson, San Diego, CA (US); Martin Franklin, San Diego, CA (US); Christopher L. Knauft, San Diego, CA (US)

(73) Assignee: Macrovision Corporation, Sunnyvale, CA (US)

( * ) Notice: Subject to any disclaimer, the term of this patent is extended or adjusted under 35 U.S.C. 154(b) by 0 days.

(21) Appl. No.: 09/231,140

(22) Filed: Jan. 15, 1999

Related U.S. Application Data

(60) Provisional application No. 60/071,737, filed on Jan. 16, 1998.

(51) Int. Cl.⁷ .............................. H04L 9/00; G06T 15/70
(52) U.S. Cl. ...................................... 713/167; 345/474
(58) Field of Search .................... 713/167, 168, 713/176, 155, 156, 185; 705/51, 64, 65, 67, 75; 345/473, 474

(56) References Cited

U.S. PATENT DOCUMENTS

| | | | |
|---|---|---|---|
| 4,919,545 A | 4/1990 | Yu ................................ | 380/25 |
| 5,023,907 A | 6/1991 | Johnson et al. ................. | 380/4 |
| 5,103,476 A | 4/1992 | Waite et al. .................... | 380/49 |
| 5,222,134 A | 6/1993 | Waite et al. .................... | 380/25 |
| 5,235,642 A | 8/1993 | Wobber et al. ................. | 380/25 |
| 5,319,705 A | 6/1994 | Halter et al. .................... | 380/4 |
| 5,321,841 A | 6/1994 | East et al. ..................... | 395/725 |
| 5,375,240 A | 12/1994 | Grundy ........................ | 395/700 |
| 5,400,403 A | 3/1995 | Fahn et al. ..................... | 380/21 |
| 5,559,884 A | 9/1996 | Davidson et al. | |
| 5,572,590 A | 11/1996 | Chess ............................ | 380/4 |
| 5,982,390 A | * 11/1999 | Stoneking et al. ........... | 345/474 |
| 6,289,320 B1 | * 9/2001 | Drummond et al. .......... | 705/35 |
| 6,317,868 B1 | * 11/2001 | Grimm et al. ............... | 709/225 |

FOREIGN PATENT DOCUMENTS

| | | | |
|---|---|---|---|
| EP | 0 367 700 A3 | 12/1989 | ............. G06F/1/00 |
| EP | 0 567 800 A1 | 2/1993 | ............. G06F/1/00 |
| EP | 0 653 695 A2 | 2/1994 | ............. G06F/1/00 |
| EP | 0 689 120 A1 | 6/1995 | ............. G06F/1/00 |
| EP | 0778520 A2 | 6/1997 | |
| WO | WO00/14631 | 3/2000 | |

OTHER PUBLICATIONS

"Virus Checker Integrated in Web Explorers and File Transfer Protocol Utilities" IBM Technical Disclosure Bulletin, vol. 39, No. 1, Jan. 1996, p. 193.

* cited by examiner

*Primary Examiner*—Matthew Smithers
(74) *Attorney, Agent, or Firm*—MacPherson Kwok Chen & Heid LLP

(57) ABSTRACT

A system and method for controlling the usage of data objects in component object systems. According to the invention, each data object includes a peer list that defines one or more peer data objects that are required by the data object. Upon receipt of a data object, the system verifies the integrity of the data object. Further, the system identifies the integrity of the peer data objects. If the system cannot find the peer data objects, or the system cannot authenticate the peer data objects, the system may optionally retrieve a peer data object that can be authenticated from a data object depository. In addition to validating the integrity of the data object, the system verifies that the data object is authorized to communicate with each of the peer data objects. Further, the system verifies that the peer data objects are authorized to communicate with the data object.

32 Claims, 10 Drawing Sheets

— 206

— 510

301. Preemption with respect to other laws1
(a) On and after January 1, 1978, all legal or equitable rights that are equivalent to any of the exclusive rights within the general scope of copyright as specified by section 106 in works of authorship that are fixed in a tangible medium of expression and come within the subject matter of copyright as specified by sections 102 and 103, whether created before or after that date and whether published or unpublished, are governed exclusively by this title. Thereafter, no person is entitled to any such right or equivalent right in any such work under the common law or statutes of any State.

DATA SUBCOMPONENT

```
import java.io.";
public class Count{
    public static void countChars(Reader in) throws IOException
    {
        int count=0;

while (in.read() !=-1
            count++;
        System.out.println("Counted" + count +" chars.");
    }
    // ... main method omitted ...
}
```

CODE DATA FIELD

FIG. 8

SYSTEM AND METHOD FOR AUTHENTICATING PEER COMPONENTS

RELATED APPLICATIONS

This application claims the benefit of and incorporates by reference U.S. Provisional Application No. 60/071,737, filed on Jan. 16, 1998.

BACKGROUND OF THE INVENTION

1. Field of the Invention

The invention pertains to the field of data management. More particularly, the invention pertains to a system and method for authenticating peer data objects in component object systems.

2. Description of the Related Technology

Historically, software applications were designed like warehouses that were used to support factories prior to the advent of just-in-time (JIT) manufacturing. Before JIT manufacturing, warehouses were stored with every part without regard to when the part would be needed or whether the part would be needed at all. Similarly, software applications have traditionally been built using a plurality of modules that are stored in the software application, regardless of whether all of the modules may be needed. One technological problem in developing an object based solution is that software code is typically compiled and linked into an executable program. Once the code is in an executable state, integrating further components into the program is difficult.

However, new object models now provide for the dynamic integration of data objects into a working application. For example, Internet browsers, using an interpretive environment, allow for the dynamic integration of various data objects, such as a Java applet, into the Internet browser.

Although data objects according to current object models contain some limited one-way security features, there is currently no way for the data object to authenticate the identity of the browser and for the browser to authenticate the identity of the data object. At most, data objects are designed with a simple security scheme in which the browser can decide whether or not to trust the data object. If the data object is trusted, the data object is granted access to certain system features. Otherwise, if the data object is not trusted, the data object is given limited access to system features.

Moreover, using current technology, data objects cannot verify the identity of the browser or other data objects that may have been installed in the browser. Due to this limitation, secure and protected data objects cannot be developed since they cannot guarantee that the target environment will recognize and understand their internal security.

Therefore, there is a need for a system that can authenticate the identity of a data object to its peers each time the data object is used. In addition, the system should be able to authenticate the identity of the peers to the data object. After the data object and the peer data objects are identified, the data object should be able to dynamically connect with the peer data objects. Also, if the data object needs a selected peer data object, and if the selected peer data object cannot be found on the system or the peer data object cannot be authenticated, the system should be able to retrieve a peer data object that can be authenticated.

SUMMARY OF THE INVENTION

The animating system of the present invention has several features, no single one of which is solely responsible for its desirable attributes. Without limiting the scope of this invention as expressed by the claims which follow, its more prominent features will now be summarized.

One embodiment of the invention includes a method of controlling the usage of data in a computer having one or more peer data objects, the method comprising providing a data object, the data object including a description of one or more of the peer data, determining whether the peer data objects are authorized to communicate with the data object, determining whether the data object is authorized to communicate with the peer data objects, and connecting the data object to the peer data objects based upon authorization being granted such that the data object can communicate with the peer data objects and the peer data objects can communicate with the data object.

Another embodiment of the invention includes a system for controlling the usage of a data object, the system comprising one or more peer data objects, the peer data objects collectively defining a software application, a parser capable of reading from a data object a description of one or more peer data objects that are required for use of the data object, a validate data object module capable of determining whether the data object is authorized to communicate with one or more peer data objects, a validate peer module capable of determining whether the peer data objects are authorized to communicate with the data object, and a wiring module capable of controlling the connection of the peer data objects to the data object.

BRIEF DESCRIPTION OF THE DRAWINGS

FIG. 7 is a block diagram illustrating exemplary data that may be contained in the subcomponents that are shown in FIG. 3.

FIG. 8 is a block diagram illustrating exemplary code that may be contained in the subcomponents that are shown in FIG. 3.

DETAILED DESCRIPTION OF EMBODIMENTS OF THE INVENTION

The following detailed description is directed to certain specific embodiments of the invention. However, the invention can be embodied in a multitude of different ways as defined and covered by the claims.

System Overview

Figure 1:
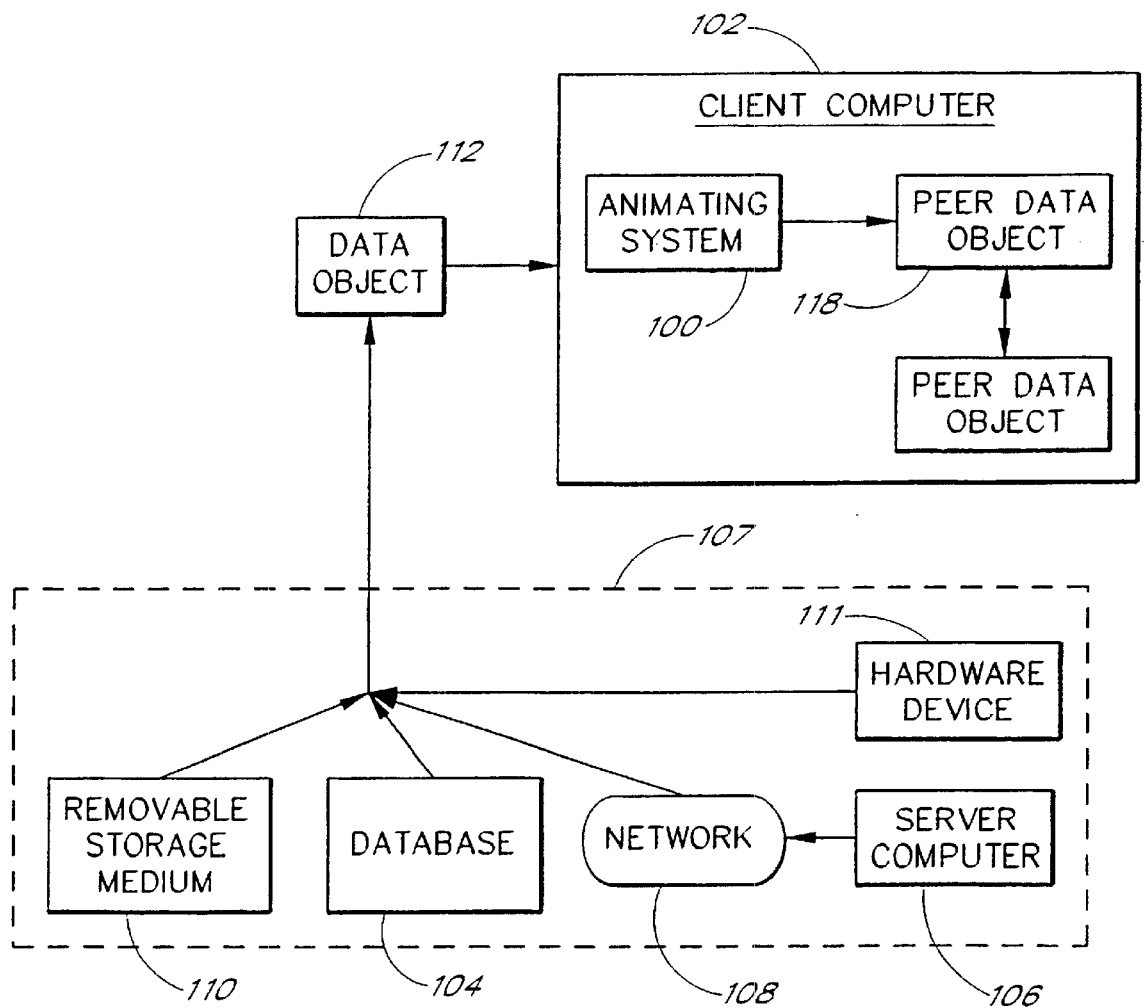
FIG. 1 is a high-level block diagram illustrating a plurality of data object providers, a data object, and an animating system of the present invention that connects the data object to one or more peer data objects.

FIG. 1 is a high-level block diagram illustrating an animating system 100 of the present invention. The animating system 100 enables the authentication and connection of a data object 112 to one or more peer data objects or components 118 in a secure and protected environment. Subsequent to authentication and assuming the data object 112 is authorized to communicate with the peer data objects 118, the animating system 100 coordinates the connection of the data object 112 with the peer data objects 118.

As shown in FIG. 1, the animating system 100 may communicate with one or more data object providers 107 that contain the data object 112. An exemplary data object providers may be one of the following: a database 104, a server computer 106, a removable media storage 110, or a hardware device 111. The removable media storage 110 can be a floppy disk, a compact disk, a hard disk, a tape drive, a ROM, or other persistent storage medium. The hardware device 111 can be a logic chip, a ROM, a RAM, a smart card, or a central processing unit.

In one embodiment of the invention, the data object 112 may be maintained in a Java Archive (JAR) file. JAR is a platform-independent file format that aggregates many files into one. Using the JAR file format, multiple Java applets and their requisite components can be grouped together in a single file thereby facilitating the transfer of the applets between computers. Additional information regarding JAR files is located in Jar Guide published by Sun Microsystems, Inc. of Mountainview, Calif., and which is hereby incorporated by reference. In another embodiment of the invention, the data object 112 is a hardware device.

It is noted that each of the peer data objects 118 is a data object as defined herein with the term peer merely distinguishing its role. The schema of the data object 112 and the peer data objects 118 is set forth below with reference to FIG. 3.

The peer data objects 118 can define together, or in isolation, one or more software applications. The software applications may include, for example, a word processor, a database, a personal finance utility, a graphics tool, an Internet browser, a computer game, a communications program, an authorization program, an electronic wallet, a multi-media renderer or a contract manager. A process for using the peer data objects is set forth below with reference to FIG. 10.

In one embodiment of the invention, the animating system 100 is an executable computer program that resides on a client computer 102. The animating system 100 includes various modules that are typically separately compiled and linked into a single executable program. The modules of the animating system 100 are described below with reference to FIG. 6.

The animating system 100 (FIG. 1) may be written in any programming language such as C, C++, BASIC, Pascal, Java, and FORTRAN. C, C++, BASIC, Pascal, Java, and FORTRAN are industry standard programming languages for which many commercial compilers and interpreters can be used to create executable code. Further, the animating system 100 may be used in connection with various operating systems such as, for example, UNIX, Solaris, Disk Operating System (DOS), OS/2, Windows 3.X, Windows 95, Windows 98, Windows CE, Palm Pilot OS, and Windows NT.

The client computer 102 may be any conventional general purpose computer using one or more microprocessors, such as, for example, a Pentium processor, a Pentium II processor, a Pentium Pro processor, an xx86 processor, an 8051 processor, a MIPS processor, a Power PC processor, or an Alpha processor. Additionally, the client computer 102 may be a specialized computer, such as a handheld computer, a telephone, a router, a satellite, a smart card, an embedded computing device, or a network of computing devices.

Figure 2:
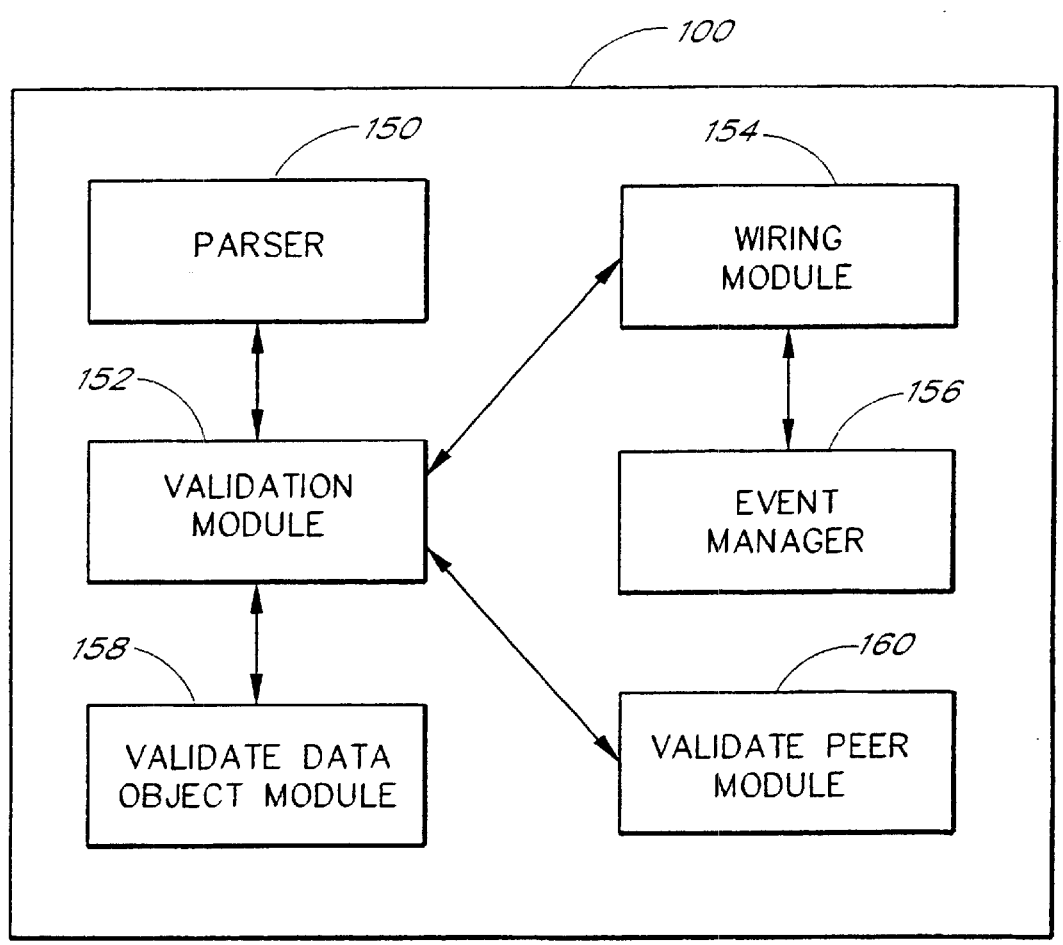
FIG. 2 is a block diagram illustrating a number of the modules that comprise the animating system shown in FIG. 1.

FIG. 2 is a block diagram illustrating the components of the animating system 100 (FIG. 1). The animating system 100 includes a parser 150 for reading the data object 112. The animating system 100 also includes a validation module 152. The validation module 152 includes two subcomponents, namely, a validate data object module 158 and a validate peer module 160. The validate data object module 158 is configured to verify the integrity of the data object 112 (FIG. 1) before the data object is connected to the peer data objects 118 (FIG. 1). The validate peer module 160 is used to validate the integrity of each of the peer data objects 118.

The animating system 100 also includes a wiring module 154 that communicates with the validation module 152. The wiring module 154 reads the data object 112 to determine which peer data objects and/or hardware configuration are needed by the data object for proper operation. The process for connecting the data component with the peer data components is set forth below with reference to FIG. 10.

In addition, the animating system 100 includes an event manager 156. The event manager is responsible for sending events to the data object 112 prior to the data object 112 being connected to the peer data objects 118 (FIG. 1) and afterwards.

Figure 3:
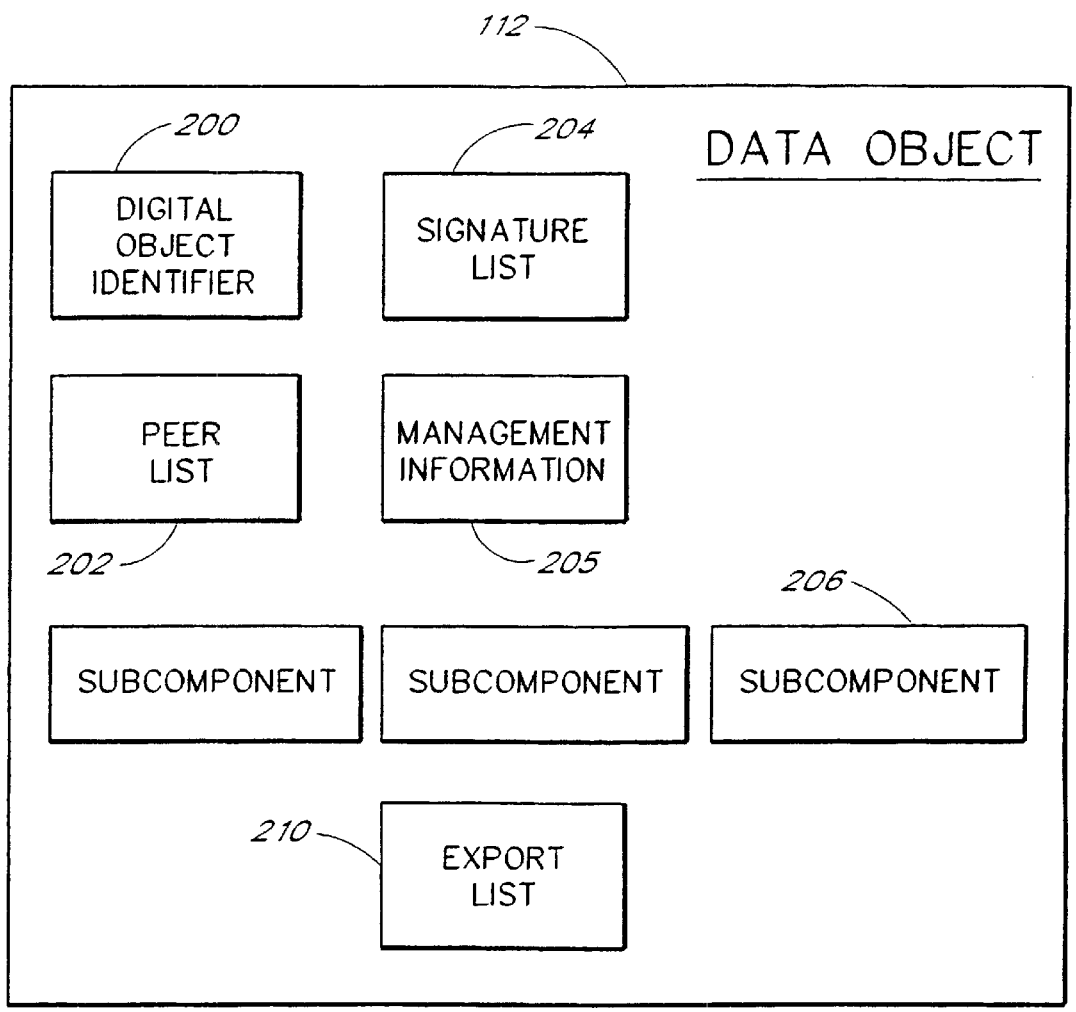
FIG. 3 is a block diagram illustrating the components of the data object that is shown in FIG. 1, the components including: a digital object identifier, a peer list, a signature list, management information, one or more subcomponents, and an export list.

FIG. 3 is a diagram that illustrates the constituent parts of the data object 112. The data object 112 includes a digital object identifier 200 that uniquely identifies the data object. The digital object identifier can be generated according to any standard or proprietary identification schema. Additional information regarding an exemplary digital object identification framework is described in About the DOI published by the International Digital Object Identifier Foundation and which is hereby incorporated by reference.

The data object 112 also includes a peer list 202 (FIG. 3). The peer list 202 defines all of the peer data objects, such as are shown in FIG. 1, that are needed by the data object 212 for proper operation. In one embodiment of the invention, the peer list 202 is a linked list of peer list structures (not shown), each of the peer list structures representing one of the peer data objects 118. Each of the peer list structures contain the name of a peer data object, a version number that is associated with the peer data object, and a location identifier. The location identifier designates a location where the peer data object may be retrieved, if the data object is not stored on the client computer 102. In one embodiment of the invention, the location identifier is a Universal Resource Locator (URL) that designates a website. Alternatively, the location identifier may identify the database 104.

Optionally, the peer list 202 may include a description of a decryption data object (not shown) that is responsible for decrypting the contents of the subcomponents of the data object 112.

The data object 112 also includes a signature list 204 (FIG. 3). The signature list 204 contains one or more digital signatures that can be used to authenticate the identity of one or more signers of the signatures in the signature list 204.

Each digital signature of the data object 112 is based on both the content of the data object 112 and the signer's private key. Each of the digital signatures may by created through the use of a hash function and a private signing function that encrypts the data object using the private key. Each of the digital signatures also includes a public key that may be used to verify the authenticity of the data object 112.

In one embodiment of the invention, each of the digital signatures has an associated digital certificate. Digital certificates are issued by a certifying authority that vouches for the identities of those to whom it issues digital certificates with a given key.

When the public and private keys are available for the data object 112, the public key is sent to the certifying agency with some proof of identification. The certifying authority checks the identification and then sends the certificate requestor a certificate attesting to the binding between the name of the provider of the data object 112 and the public key along with a hierarchy of certificates, or certificate chain, verifying the certifying authority's public key. The provider of the data object 112 can present this certificate chain whenever desired in order to demonstrate the legitimacy of the provider's public key. Additional information regarding digital signatures and digital certificates is described in RSA Data Security for example.

The data object includes management information 205. The management information 205 can include the name of the provider of the data object 112, the name of the data object, and/or any other information that the provider of the data object 112 wants to include about the data object 112.

Also, the data object 112 includes one or more subcomponents 206. The subcomponents include the content of the data object 112. A description of each of the types of subcomponents 206 is set forth below with reference to FIG. 3.

Lastly, the data object 112 includes an export list 210. The export list 210 defines the procedures that are exported to peer data objects 118 and the animating system 100. The peer data objects 118 use the exported routines for accessing the subcomponents 206 that are associated with the data object 112. A description of the export list 210 is set forth below with reference to FIG. 5.

Figure 4:
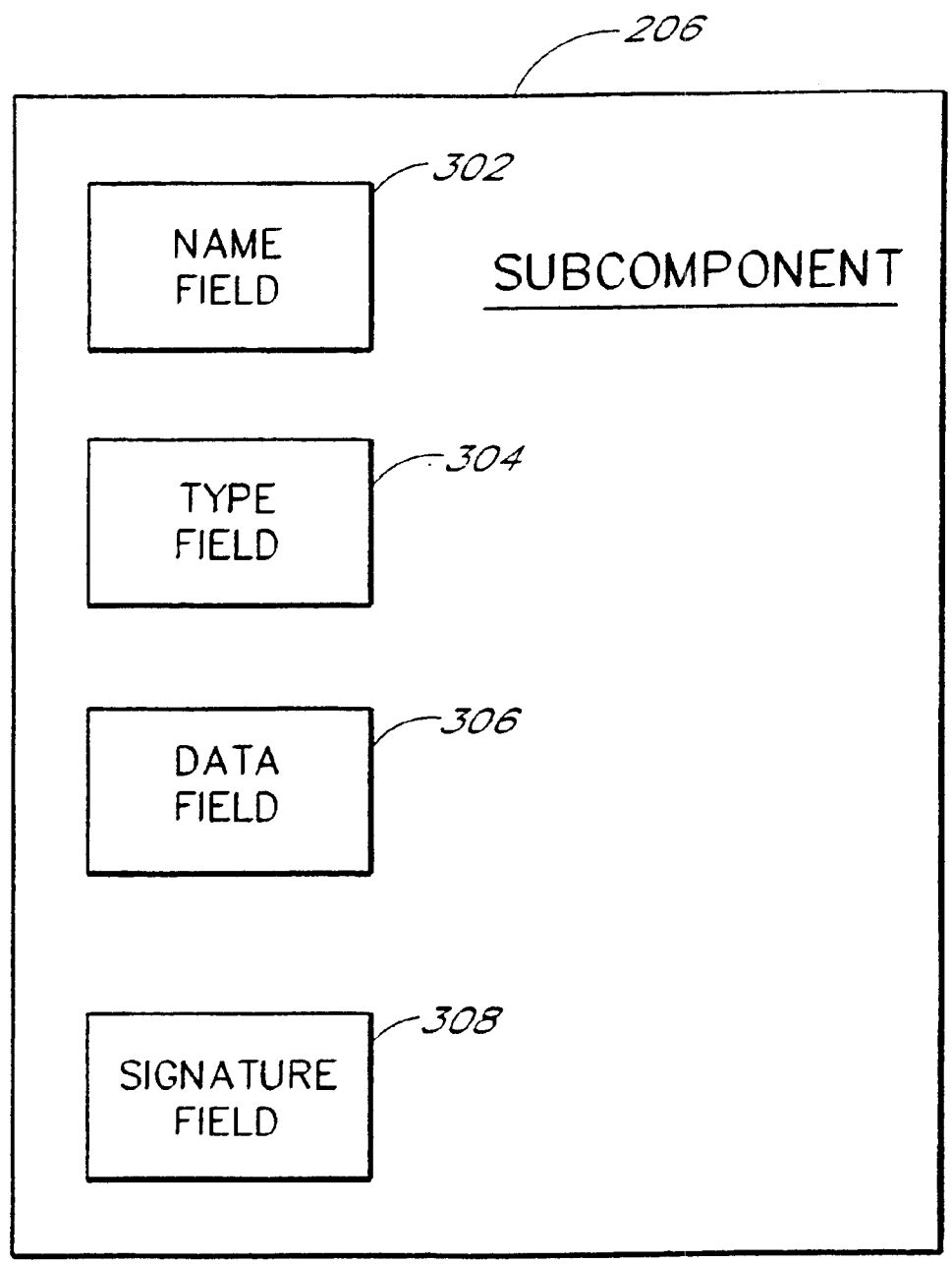
FIG. 4 is a block diagram illustrating the elements of one of the subcomponents that are shown in FIG. 3.

FIG. 4 is a block diagram illustrating the elements in each of the subcomponents 206 (FIG. 3). Each subcomponent 206 includes a name field 302, a type field 304, a data field 306, and a signature field 308. The name field 302 contains an arbitrary character sequence that identifies the subcomponent 206. The type field 304 of the subcomponent 206 includes a description of the type of the subcomponent 206.

In one embodiment of the invention, each of the subcomponents 206, is defined to fall within one of the six types: peer-wiring, animator-wiring, self-wiring, data, state, and code. The type of each of the subcomponents 206 determines which type of information is included in the data field 306. For convenience of description, each type of the subcomponents 206 is referred to below by the identifier that is defined in the type field 304. For example, a subcomponent having a type field 304 that identifies self-wiring is referred to as a self-wiring subcomponent. As another example, a subcomponent having a type field 304 that designates data is referred to as a data subcomponent.

In one embodiment of the invention, the peer-wiring subcomponents, the animator-wiring subcomponents, and the self-wiring components are each serialized JavaBeans. Additional information regarding JavaBeans can be found in the *JavaBeans API Specification, Versions* 1.01 published by Sun Microsystems, which is hereby incorporated by reference.

Each of the peer-wiring subcomponents, i.e., selected subcomponents 206 in the data object 112, describes the connection between state subcomponents in the data object 112 and state subcomponents in one of the peer data objects 118 (FIG. 1).

Each animator-wiring subcomponent includes a description of how to connect state components in the data object 112 to the animating system 100 (FIG. 1). Still referring to FIG. 3, a self-wiring component includes a description of how to connect two state subcomponents within the data object 112. Data subcomponents, state subcomponents, and code subcomponents are used to define the function of the data object 112 once the data object 112 is connected to the peer data objects 118 (FIG. 1).

In one embodiment of the invention, the data subcomponents, the state subcomponents, and the code subcomponents are implemented using the Java programming language. In this embodiment, each state subcomponent is a serialized JavaBean. Further, each code subcomponent is a Java class. It is noted, however, that in alternative embodiments of the invention, the code component can also comprise other types of code such as, for example, a Visual Basic Script, a JavaScript, or a dynamic linked library (DLL).

Lastly, the signature field 308 (FIG. 3) defines one or more digital signatures for the subcomponent 206. Each of the digital signatures in the signature field 308 is a unique identifier for each subcomponent similar to unique identifiers provided in the signature list 204 (FIG. 3).

Figure 5:
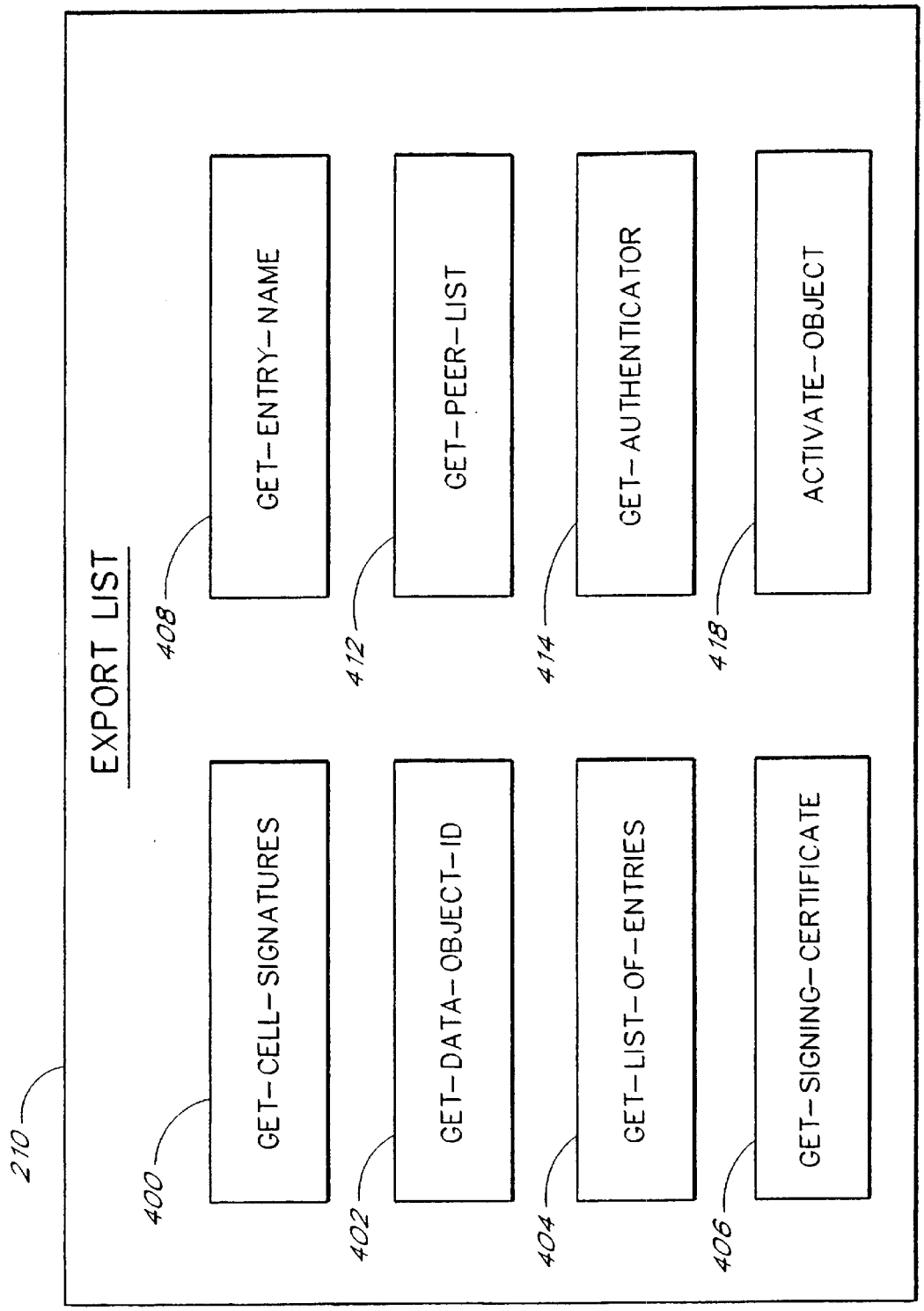
FIG. 5 is a block diagram illustrating the elements of the export list that is shown in FIG. 3.

FIG. 5 is a diagram illustrating the procedures of the export list 210. The export list 210 defines the list of procedures that are exported by the data object 112. The export list 210 includes a get-cell-signatures procedure 400 that provides the signature list 204 (FIG. 3) to the animating system 100 (FIG. 1). The animating system 100 (FIG. 1) uses the signature list 204 to determine the identity of the signers of the digital object 112.

Further, the export list 210 includes a get-data-object-id procedure 402. Upon invocation, the get-data-object id procedure 402 provides to a requester, such as the animating system 100 or the peer data objects 118, the digital object identifier 200 (FIG. 3). With reference to FIGS. 1 and 3, the animating system 100 can use the object identifier 200 to determine whether the data object 112 should be allowed to connect with the peer data objects 118.

Also, as shown in FIG. 5, the export list 210 includes a get-list-of-entries procedure 404. The get-list-of-entries procedure 404 provides to the animating system 100 (FIG. 1), a list of the names that are identified in the name field 302 (FIG. 4) in each of the subcomponents 206 (FIG. 3).

In addition, the export list 210 includes a get-signing-certificate procedure 406. Using the get-signing-certificate procedure 406, any of the peer data objects 118 via the animating system 100 can obtain the a digital certificate that is associated with one or more of the digital signatures that are in the data object 112 (FIG. 1).

Also, the export list 210 includes a get-entry-name procedure 408. The get-entry-name procedure 408 provides to a requester a handle to a selected one of the subcomponents 206 (FIG. 3). It is noted that before the requestor can request the handle to one of the subcomponent 206, the selected subcomponent should be wired to the requestor by the animating system 100.

The export list 210 also includes a get-peer-list procedure 412. The get-peer-list procedure 412 provides the peer list 202 (FIG. 3) to the animating system 100 (FIG. 1). The animating system 100 uses the peer list 202 to determine whether each of the peer data objects 118 that may be needed by the data object 112 are contained within the client computer 102.

In addition, the export list 210 also defines a get-authenticator procedure 414. The get-authenticator procedure 414 provides the name of an authenticating system (not shown) that can be used to provide the conditions under which the data object 112 will allow itself to be connected to the peer data objects 118 (FIG. 1). In one embodiment of the invention, the authenticating system is one of the subcomponents in the data object 112. In another embodiment of the invention, the authenticating system is a component in the animating system 100. In yet another embodiment of the invention, the authenticating system is contained in one of the peer data objects 118.

The authenticating system examines a plurality of arbitrarily defined conditions regarding the data object 112 before the authenticating system allows the data object 112 to be connected to a target data object, such as one of the peer data objects 118. In one embodiment of the invention, the authenticating system examines the signatures in the signature list 204 and each signature field 308 in the subcomponents 206 to verify the identity of the target data object. Once the identity of a requester, such as one of the peer data objects 118, is determined, the authenticating system determines whether the requester should be allowed to connect with the data object 112.

Lastly, the export list 210 includes an activate-object procedure 418. The activate-object procedure 418 is used by the animating system 100 (FIG. 1) to activate the data object 112 after the animating system 100 connects the data object 112 to the peer data objects 118.

Figure 6:
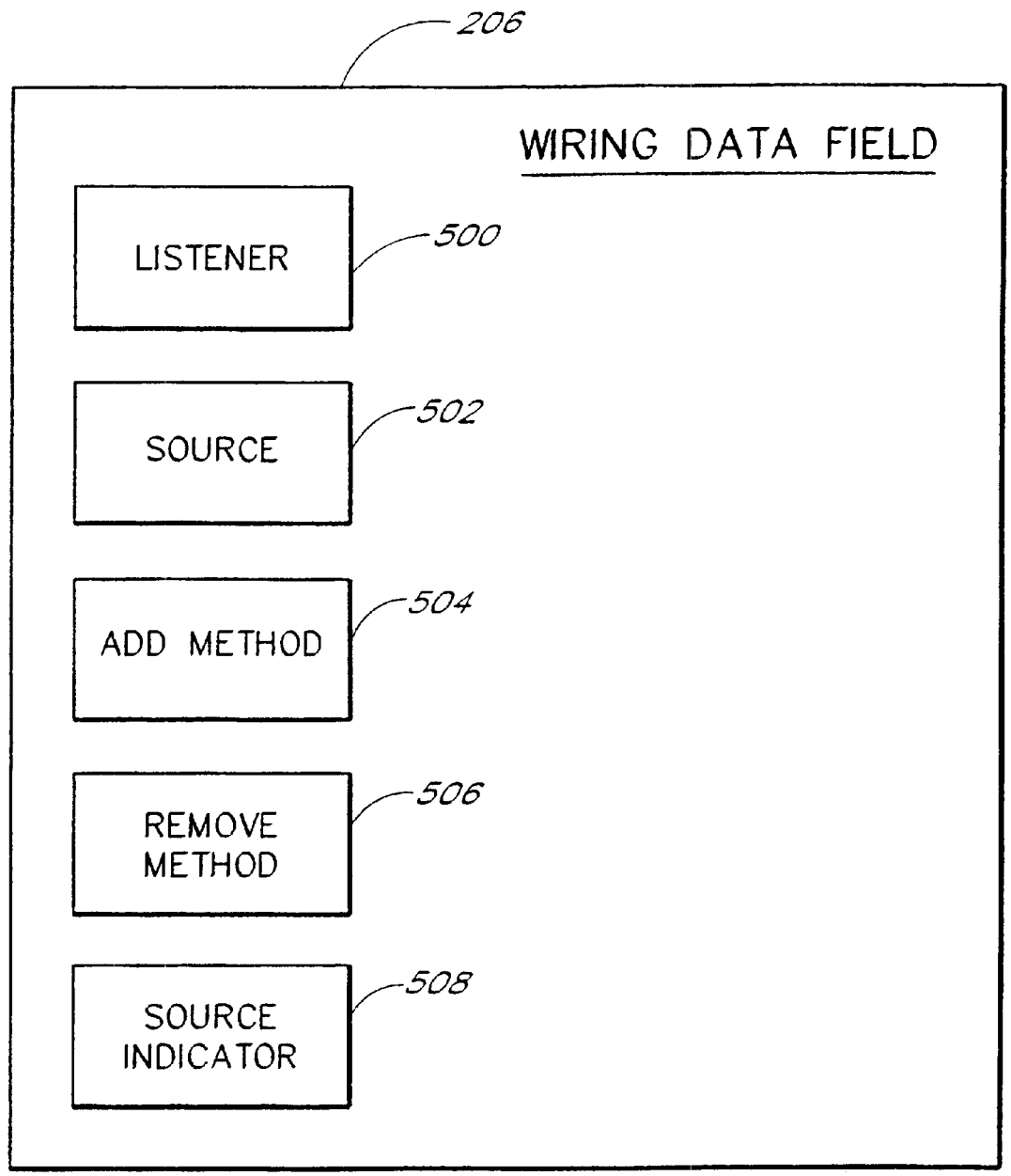
FIG. 6 is a block diagram illustrating a wiring data field that is contained in selected subcomponents that are shown in FIG. 3.

FIG. 6 is a diagram that illustrates the elements in a wiring data field. The wiring data field describes the content of the data field 306 (FIG. 4) for peer-wiring subcomponents, animator-wiring subcomponents, and self-wiring subcomponents. Each of the data fields 306 (FIG. 4) that are associated with the wiring subcomponents describes how to interconnect two of the state subcomponents. The data field defines a listener 500, a source 502, an add method 504, a remove method 506, and a source indicator 508.

The listener 500 contains a listener identifier that identifies one of the subcomponents 206 as being responsible for listening to events. As a counterpart to the listener 502, the source 502 contains a source identifier that identifies one of the subcomponents 206 as being responsible for sending events.

The add method 504 identifies a method on the source component to start the listener component receiving events. The remove method 504 identifies a method on the source component that may be invoked to stop the listener subcomponent from listening to events. The source identifier identifies the direction of the events identified by the listener 500 and the source 502. Additional information regarding connecting subcomponents in a Java embodiment may be found in the *JavaBeans API Specification, Version* 1.01 by Sun Microsystems, pp. 54–58.

FIG. 7 is a block diagram illustrating a data item 510 of exemplary content that may be contained in the data field 306 of a data subcomponent. It is noted that data can include, by way of example, a book, a poem, an article, bank account information, a contract, a multimedia presentation, or any other type data that a data content provider desired to protect in a secure environment.

FIG. 8 is a block diagram illustrating an exemplary item 512 of code that may be contained in the data field 306 (FIG. 4) of a code subcomponent. Each code subcomponent typically includes user-defined aggregate data types. For example, a code subcomponent may contain both data members representing the data types and function members that implement operations on the data types. In the example, as shown in FIG. 8, the code subcomponent contains a Java class.

Each of the state subcomponents define the instance information for one of the class subcomponents. For example, referring to FIG. 8, an instance of the Java class shown in FIG. 8 can include information regarding the state of the variable "count."

System Operation

Figure 9:
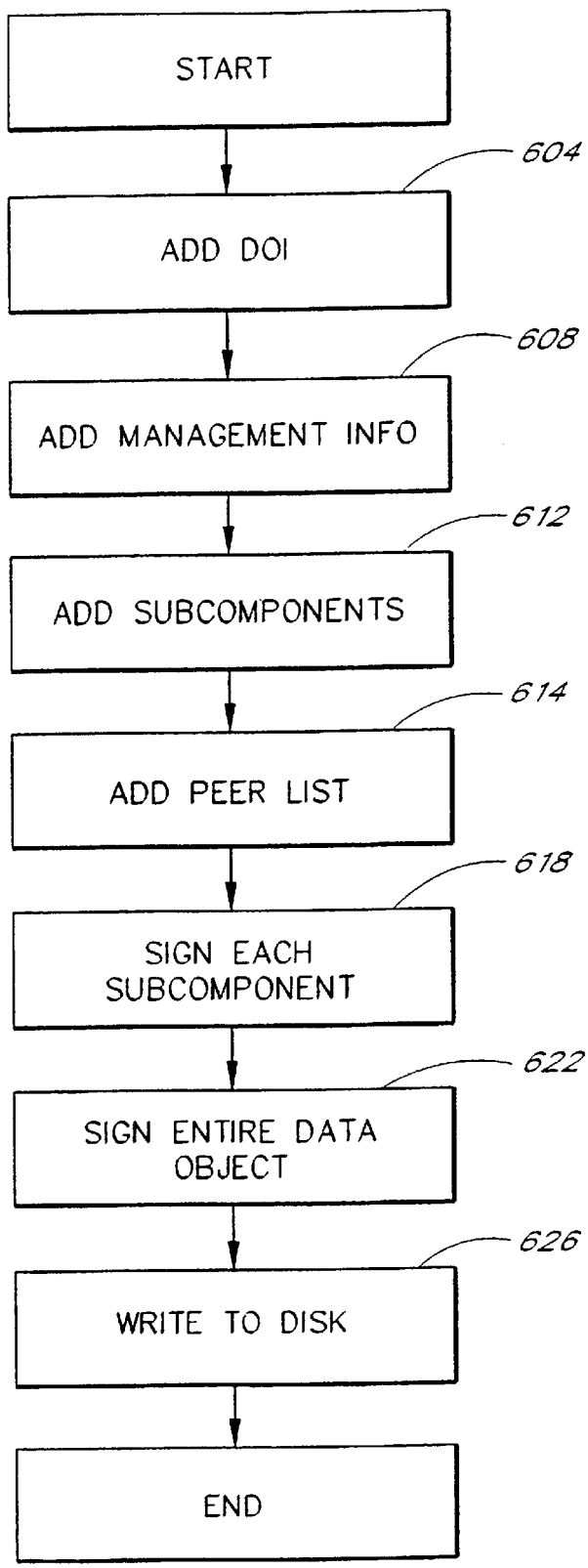
FIG. 9 is a flowchart illustrating a process for creating the data object that is shown in FIG. 3.

FIG. 9 is a flowchart illustrating a process for creating the data object 112 that is shown in FIG. 1. It is noted that the data object 112 can be created using any known object model, such as Java Beans, Active X, LiveConnect, and OpenDoc, or the System Object Model (SOM), or any object model that may be developed later. In one embodiment of the invention, the data object 112 is created on the server computer 106 via a data object packager (not shown). In this embodiment, each of the states shown in FIG. 9 correspond to a public method of the data object packager. A data object provider, that desires to create a data object, invokes each of the public methods of the data object packager in succession to create the data object. It is noted that in one embodiment of the invention, a data object 112 is created by the animating system 100.

Starting at state 604, the content provider desires to distribute some type of information to others. For instance, the information can include a book, a poem, an article, bank account information, a contract, a multimedia presentation, video, music, a universal resource identifier to dynamic content, such as streaming media, or any other type data that a data content provider desires to protect in a secure environment.

At the state 604, a digital object identifier 200 that uniquely identifies the data object 112 is added to the data object 112. In one embodiment of the invention, the data object identifier is provided by the animating system 100. In another embodiment of the invention, the data object identifier is acquired from a third party.

Continuing to a state 608, the management information 205 (FIG. 3) is input into the data object 112 (FIG. 1). The management information 205 can include the name of the provider of the data object 112, the name of the data object, and/or any other information that the provider of the data object 112 wants to include about the data object 112.

Next, at a state 612, the subcomponents 206 (FIG. 3) are added to the data object 112. The subcomponents include: animator-wiring subcomponents, self-wiring subcomponents, peer-wiring subcomponents, data subcomponents, and code subcomponents. The purpose of each of the foregoing subcomponents is described above with reference to FIG. 4.

Moving to a state 614, the peer list structures that collectively comprise the peer list 204 (FIG. 3) are added to the data object 112 (FIG. 1). Each peer list structure receives the name of a selected one the peer data objects 118 (FIG. 1), a version number of the selected peer data object, and a location identifier of where the selected peer data object may be located, if the selected peer data object cannot be found in the client computer 102 (FIG. 1).

Continuing to a state 618, each of the subcomponents 206 (FIG. 3) is digitally signed by one or more signers. Each of the digital signatures may by created through the use of a hash function and a private signing function that encrypts the resulting hash of the data object using a private key.

Next, at a state 622, the data object 112 is digitally signed by one or more signers. The data object 112 may be signed by the same process that is used to sign each of the subcomponents as described above with reference to the state 622. In one embodiment of the invention, the Certificate Security Suite by RSA Data Security of San Mateo, Calif. may be used for the signing process.

Finally, in a state 626, the data object 112 is stored in a data storage device, such as a disk. In one embodiment of the invention, the data object 112 is serialized using Java Serialization and is stored as a JAR file. In another embodiment of the invention, the data object 112 is stored as an ASCII text file.

Figure 10:
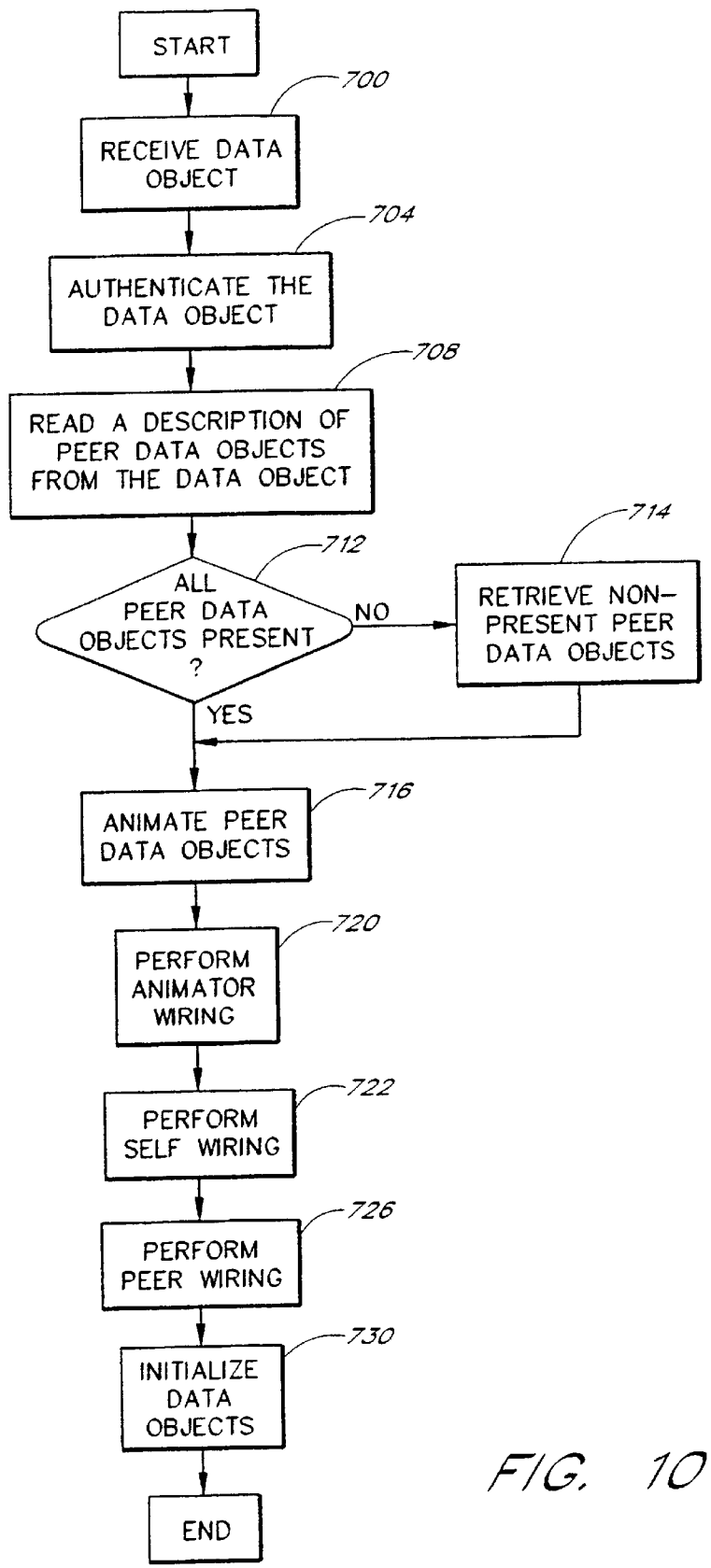
FIG. 10 is a flowchart illustrating a process for connecting the data objects with the peer data objects shown in FIG. 1.

FIG. 10 is a flowchart illustrating a process of integrating the data object 112 (FIG. 1) with the peer data objects 118 (FIG. 1). Starting at a state 700, the client computer 102 (FIG. 1) receives the data object 112 from a data object provider. The data object provider can be, for example, the database 104, the server computer 110, or the removable storage medium 110 as are shown in FIG. 1.

In one embodiment of the invention, the animating system 100 (FIG. 1) is automatically notified of the presence of the data object 112 by the operating system (not shown) on the client computer 102 after the data object 112 is received by the client computer 102. In this embodiment, the operating system is configured to examine the management information 205 (FIG. 3) in the data object 112 to determine a handler for the data object. Further, in this embodiment, the management information 205 designates the animating system 100 as its handler.

It is noted that once the data object 112 is received by the client computer 102 (FIG. 1), the data object 112 is in an unusable state by the peer data objects 118. Before the data object 112 can be connected with the peer data objects 118, the identity of each of the peer data objects 118 needs to be established. Further, the animating system 100 needs to determine whether the peer data objects 118 are authorized to communicate with the data object 112.

Next, at a state 704 (FIG. 10), the animating system 100 (FIG. 1) authenticates the data object to ensure that the data object 112 has not been improperly altered or has been otherwise tampered with. The animating system 100 examines each of the signatures in the signature list 204 (FIG. 3) using a public key that may be obtained from the provider of the data object 112. Further, the animating system 100 may use the get-signing-certificate procedure 406 (FIG. 5) to analyze one or more digital certificates that are associated with the data object 112.

Moving to a state 708 (FIG. 10), the animating system 100 (FIG. 1) uses the get-peer-list procedure 412 (FIG. 5) to obtain the peer list 202 (FIG. 3). Continuing to a state 712 (FIG. 10), the animating system 100 determines whether all of the required peer data objects 118 that are identified by the peer list 202 are present in the client computer 102. If all of the peer data objects 118 are not present, the animating system 100 proceeds to a state 714. At the state 714, the animating system 100 retrieves any of the non-present peer data objects 118. As discussed above, each of the peer list structures in the peer list 202 includes a location identifier that identifies where each of the non-present peer data objects 118 may be found. For example, the location identifier may reference the database 104 (FIG. 1), the server computer 106 (FIG. 1), the removable storage medium 110 (FIG. 1), or from some other depository of data objects.

If the animating system 100 (FIG. 1) cannot retrieve any of the non-present peer data objects 118, the animating system 100 stops and does not allow any further action regarding the use of the data object 112 (FIG. 1). However, if the animating system 100 can retrieve the non-present data objects, the animating system 100 proceeds to a state 716.

From either the decision state 712 or from the state 714, the animating system 100 (FIG. 1) proceeds to the state 716. At the state 716, the animating system 100 animates each of the peer data objects 118 (FIG. 1). To animate the peer data objects 118, the animating system 100 performs each of the states 700–730 (FIG. 10) in connection with each of the peer data objects 118. By executing the animating process on each of the peer data objects 118, the animating system 100 ensures that the peer data objects 118 have not been improperly altered or otherwise tampered with.

Next, at a state 720 (FIG. 10) the animating system 100 (FIG. 1) wires the data object 112 to itself. At state 720, the animating system 100 connects selected subcomponents 206 of the data object 112 to the animating system 100. In one embodiment of the invention, the animating system 100 includes a connection data object (not shown), similar in format to the data object 112, for communication with the data object 112.

In the state 720, the animating system 100 reads the data in the wiring data field 306 of each sub-component 206 as shown in FIG. 6, namely, the listener field 500, the source field 502, the add method field 504, the remove method field 506, and the source indicator field 508 to determine the proper connections for the data object 112. Additional information regarding connecting subcomponents may be found in the *JavaBeans API Specification, Version* 1.01 published by Sun Microsystems, pp. 54–58.

As part of the animator-wiring process, the animating system 100 (FIG. 1) invokes the get-authenticator procedure 414 (FIG. 5) that is associated with the data object 112 to retrieve the authentication system (not shown) for the data object 112. As was discussed above, the authentication system can reside in one or more places including, the data object 112, the animating system 100, or one of the peer data objects. The authentication system verifies for the animating system 100 whether a given connection should be made.

Continuing to a state 722, the animating system 100 (FIG. 1) interconnects the subcomponents 206 in the data object 112. Similar to the animator-wiring process, in the self-wiring process the animating system 100 examines the data wiring field in each of the self-wiring subcomponents to determine how the data object 112 is to be constructed. Upon the identification of a peer-wiring subcomponent, the animating system 100 examines the contents of the peer-wiring component to determine the appropriate connections.

Similar to the animator-wiring process, in the self-wiring process, the animating system 100 (FIG. 1) consults the authentication system to determine whether a connection should be performed. For example, the data object 112 may contain a self-wiring subcomponent that indicates that a first subcomponent should be connected to a second subcomponent. However, the authenticating system may only allow the connection as long as the provider of the data object has funds maintained in a virtual account that is maintained by the authenticating system.

Moving to a state 726, the animating system 100 (FIG. 1) performs peer-wiring. The animating system 100 searches the subcomponents 206 to find peer-wiring subcomponents. In the peer-wiring process, the animating system 100 uses the information in the wiring data field to connect the subcomponents 206 that are identified by the wiring subcomponents.

In the peer-wiring process, the animating system 100 (FIG. 1) determines whether the data object 112 is authorized to communicate with the peer data objects 118. Advantageously, each of the peer data objects 118 and the data object 112 can define, via the authentication system, various restrictions regarding their usage. As discussed above, each data object includes the get-authenticator procedure 414 (FIG. 5) that identifies the authentication system for the data object. The authenticating system defines the conditions of usage of regarding the data object.

For example, assume that the data object 112 (FIG. 1), according to the management information 205 (FIG. 3) in the data object 112, purports to be a cartoon animation for kids. However, in fact, the data object 112 has been tampered with and has been improperly modified such that it seeks out personal information from others. In this example, since the data object 112 has been changed, the animating system 100 cannot verify the signatures in the signature list 204 (FIG. 3) of the data object 112. Further, in this example, the peer data objects 118 define a personal finance program (not shown). If the data object 112 attempted to access the personal finance program, the animating system 100 (FIG. 1) would check with the peer data objects 118 to determine if the data object 112 should be authorized to access the peer data objects 118. In this instance, the authentication system of the peer data objects 118 would deny the request.

Thus, if the animating system 100 (FIG. 1) determines that the data object 112 (FIG. 1) is not authorized to access the peer data objects 118, the animating system 100 determines whether to stop or continue further action relating to the data object 112. Still referring to the state 726, if the animating system 100 determines that authorization is permitted, the animating system 100 then determines whether the peer data objects 118 are authorized to access the data object 112 via having each of the peer data objects 118 access their associated authentication system.

For example, assume that the data object 112 was created by the ACME corporation ("ACME"). In this example, the data object 112 includes in one of the subcomponents 206 a document that describes ACME's corporate policies. Further, in this example, the peer data objects 118 define a word processing system, and one of the peer data objects 118 is responsible for editing documents and another of the peer data objects 118 is responsible for viewing documents. One of the subcomponents 206 (FIG. 3) in the data object 112 may indicate that only system administrators are authorized to edit the data object 112. If the data object 112 is distributed to an employee, ACME can setup the data object 112 such that the data object 112 is not authorized to connect with the peer data object that is responsible for editing. In this example, the data object 112 would only be setup to be authorized to communicate with the viewing data object.

Finally, at a state 730, the animating system 100 (FIG. 1) initializes the data object 112 by invoking the activate-object procedure 418 (FIG. 5) that is associated with the data object 112.

The animating system 100 (FIG. 1) of the present invention enables the dynamic connection of data components in a secure environment. The animating system 100 ensures that before the data object 112 is connected to one of the peer data objects 118, that the peer data object has not been improperly altered. Further, the animating system 100 of the present invention includes a two-way security scheme, in which the data object depending on the identity of the peer data objects, authorizes the peer data objects to communicate with the data object. Conversely, each of the peer data objects verify the contents of the data object. Each of the peer data objects may depending on the identity of the data object, determine whether to allow the data object to communicate with themselves.

The data objects of the present invention may be advantageously used to define various type of electronic commerce management solutions. For example, using the present invention, one of the peer data objects may act as a contract manager for a "managed" data object. Before an act is performed using the managed data object, the contract manager can require the payment of a fee by a user. Optionally, the contract manager may provide a "contract" data object that defines the terms of the usage of the managed data object. The contract data object can contain virtual money that is debited each time another data object requests an action from the managed data object. Further, the contract object can place variable restrictions regarding the usage of the managed data object, such as defining access to the managed data object for a particular time or for a particular number of uses. The variable restrictions can be dependent on one or more payment plans that may be selected by the other data objects.

Also, for example, the data object of the present invention could be advantageously used to define a buyer data object. The buyer data object can be distributed over the Internet with some virtual money and configured to look for the cheapest seller of a particular good. In this example, the buyer data object may be digitally signed by a bank that confirms that the data object has valid virtual money.

Further, for example, one or more seller data objects may be provided to sell a particular good. In one embodiment of the invention, when the buyer data object encounters the seller data object, the buyer data object could attempt to notify the provider of the buyer data object. In another embodiment of the invention, the buyer data object could be configured to negotiate with the seller data object. Advantageously, through the use of signatures and certificates, the buyer data object can verify the identity of the seller data object and confirm that the seller is actually in the business of selling the goods in question. Further, the seller agent can determine that buyer data object actually has valid virtual money to purchase the seller's goods.

The foregoing examples are but a few applications of the present invention. The animating system of the present invention enables new and limitless possibilities regarding new electronic commerce solutions.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of controlling the usage of data in a computer having one or more peer data objects, the method comprising:

providing a data object, the data object including a description of one or more of the peer data objects that are required for usage of the data object;

determining whether the peer data objects are authorized to communicate with the data object;

determining whether the data object is authorized to communicate with the peer data objects; and connecting the data object to the peer data objects based upon authorization being granted such that the data object can communicate with the peer data objects and the peer data objects can communicate with the data object.

2. The method of claim 1, additionally comprising authenticating the identity of the data object.

3. The method of claim 1, additionally comprising authenticating the identity of each of the peer data objects.

4. The method of claim 1, additionally comprising:

determining the presence of the peer data objects; and retrieving any of the peer data objects that are not present in the computer.

5. The method of claim 1, wherein the data object includes one or more subcomponents that define the usage of the data object in connection with the peer data objects.

6. The method of claim 1, wherein the peer data objects collectively define a software application.

7. The method of claim 1, wherein the software application is an Internet browser.

8. The method of claim 7, wherein the software application is an on-line virtual store.

9. The method of claim 1, wherein one of the peer data objects is a hardware device.

10. The method of claim 1, wherein the data object is encrypted.

11. The method of claim 1, wherein determining whether the peer data objects are authorized to communicate with the data object includes verifying at least one digital signature in each of the peer data objects.

12. The method of claim 1, wherein determining whether the data object is authorized to communicate with the peer data objects includes verifying at least one digital signature in the data object.

13. The method of claim 1, wherein the data object has at least one subcomponent, the subcomponent having an associated digital signature, and wherein determining whether the data object is authorized to communicate with the peer data objects includes verifying the digital signature associated with each subcomponent.

14. The method of claim 13, wherein the subcomponent contains data, and wherein the digital signature is a digitally encrypted hash of the content of the data in the subcomponent using a private key of the signer of the digital signature.

15. The method of claim 1, additionally comprising verifying the integrity of the data object.

16. The method of claim 1, wherein each of the peer data objects is a data object.

17. A system for controlling the usage of a data object, the system comprising:

one or more peer data objects, the peer data objects collectively defining a software application;

a parser capable of reading from a data object a description of one or more peer data objects that are required for use of the data object;

a validate data object module capable of determining whether the data object is authorized to communicate with one or more peer data objects;

a validate peer module capable of determining whether the peer data objects are authorized to communicate with the data object; and a wiring module capable of controlling the connection of the peer data objects to the data object.

18. The system of claim 17, additionally comprising a validation module capable of verifying the integrity of the data object.

19. The system of claim 17, additionally comprising a validation module capable of authenticating the integrity of the peer data objects.

20. A data object that is configured to be dynamically wired to one or more other data objects, the data object comprising:

a description of one or more peer data objects that are required to be connected to the data object before the data object can be accessed by the peer data objects; and at least one digital signature that identifies a provider of the data object.

21. The data object of claim 20, additionally comprising an authentication identifier that identifies an authentication system, the authentication system including one or more conditions of usage regarding the data object.

22. The data object of claim 20, wherein the digital signature was signed by a bank, and wherein the data object contains virtual currency.

23. A system for controlling the usage of data in a computer having one or more peer data objects, the system comprising:

means for reading a data object, the data object including a description of one or more of the peer data objects that are required for usage of the data object and configured into a state that is unusable by the peer data objects;

means for determining whether the peer data objects are authorized to communicate with the data object;

means for determining whether the data object is authorized to communicate with the peer data objects;

means for converting the data object into a state that is usable by the peer data objects; and means for connecting the data object to the peer data objects such that data object can communicate with the peer data objects and the peer data objects can communicate with the data object.

24. The system of claim 23, additionally comprising means for authenticating the identity of the data object.

25. The system of claim 23, additionally comprising means for authenticating the identity of each of the peer data objects.

26. The system of claim 23, additionally comprising:

means for determining the presence of the peer data objects; and means for retrieving any of the peer data objects that are not present in the computer.

27. The system of claim 23, wherein the data object includes one or more subcomponents.

28. The system of claim 23, wherein the peer data objects together define a software application.

29. The system of claim 28, wherein the software application is an Internet browser.

30. The system of claim 28, wherein the software application is an on-line virtual store.

31. The system of claim 23, wherein one of the peer data objects is a hardware device.

32. The system of claim 23, wherein the data object is encrypted.

* * * * *